H. E. HAWES.
AERIAL PROPELLER.
APPLICATION FILED SEPT. 21, 1911.
1,046,385.
Patented Dec. 3, 1912.
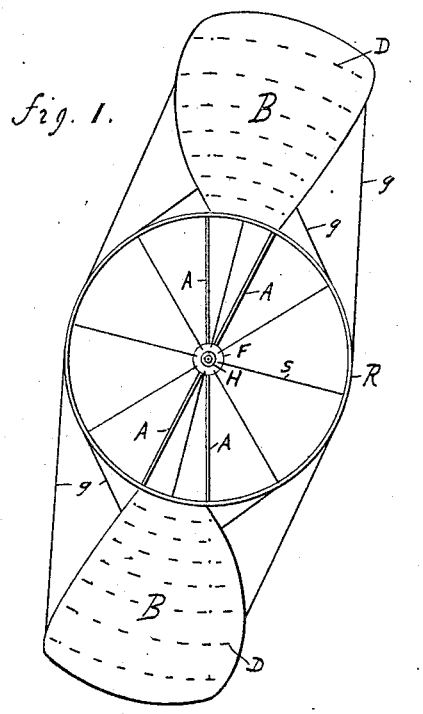
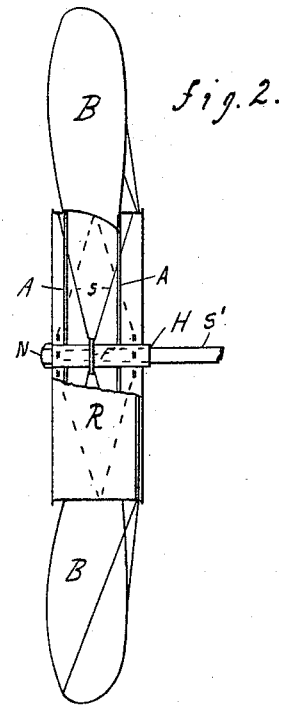
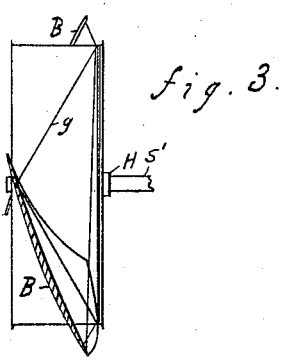
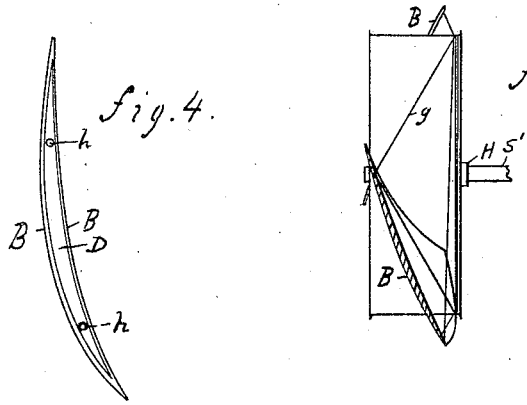
WITNESSES:
INVENTOR
Herbert E. Hawes

UNITED STATES PATENT OFFICE.

HERBERT E. HAWES, OF NEW YORK, N. Y.

AERIAL PROPELLER.

1,046,385.

Specification of Letters Patent. Patented Dec. 3, 1912.

Application filed September 21, 1911. Serial No. 650,620.

*To all whom it may concern:*

Be it known that I, HERBERT E. HAWES, a citizen of the United States, residing at Brooklyn borough, county of Kings, city and State of New York, have invented certain new and useful Improvements in Aerial Propellers, of which the following is a specification.

This invention applies to propellers for aerial vessels or flying machines.

In carrying out my invention it is my purpose to provide a propeller which is light, durable, easily repaired and efficient.

A further object is to provide a construction, in which is avoided the danger from flying pieces in case of breakage or accident. Further, my improved propeller presents the entire acting blade-surface at a favorable angle for propulsion, and reduces the drag or resistance to rotation present in wooden propellers, offered by the thickened inner ends of the blades near the axis thereof; it is easily and quickly mounted or removed, and is not affected by moisture or climatic changes.

My invention consists in the construction, arrangement and combination of parts set forth in and falling within the scope of the appended claims.

Hereafter whenever I recite the "sleeve" as the center of the propeller, it will be understood that the sleeve may be omitted, and the arms or spokes of same be mounted on the shaft direct; as the sleeve is used as the central part and the arms mounted thereon only, when temporary or removable propellers are desired.

In the accompanying drawings like reference characters indicate like parts in the various views.

In the drawings—Figure 1 is a front elevation of my propeller. Fig. 2 is a side elevation, partly broken away, showing the arrangement and supporting members of the guy-spacing ring, hereinafter described. Fig. 3 is a plan view showing the end view of the blade. Fig. 4 is a detail of the blade, showing a distance-piece between the blade side-plates. It will be observed that the outline of said distance-pieces governs the thickness, shape and curvature of the acting or propelling surface of the blades.

In carrying my invention into practice, I employ preferably a sleeve H having a taper hole therein and adapted to be mounted on the tapered end of a propeller shaft S′, and locked thereon by a nut N at the outer end, and provided optionally with a keyway therein, or a key adapted to engage a keyway in a propeller shaft. Upon this sleeve I mount groups of arms or spokes A in any suitable way, as by brazing or welding; or the arms may be threaded and screwed into the sleeve. The arms A may be mounted on the shaft direct; the said arms being disposed symmetrically so as to preserve the running balance of the propeller. Arms A are preferably flattened for part of their length to lessen resistance to rotation, the flattened part being disposed, approximately, in the line of pitch of the propeller, said flattened part extending from the blades B to the hub or sleeve H. On the outer ends of said arms, I mount blades B, comprising sheets of thin metal, cut to the assumed shape or outline, and fastened together at the leading and trailing edges thereof in any suitable manner, as by rivets or soldering; and being given the cross-sectional shape by a plurality of interposed distance-pieces D, Fig. 4, preferably of sheet metal, inserted between same, and mounted perpendicularly thereto, and held in place by rivets, soldering, or any suitable manner, and shown in dotted lines Fig. 1. Said skeleton blade is slipped over the outer end of a group of arms, and held in place by rivets through both blade and spoke, or in any suitable manner.

To rigidly hold arms A in position, I stay the same by tension-guys $g$, extending laterally and rearwardly therefrom, which brace said arms against both the forward pull while in action, and the torsional twist of the motor. Said guys are spaced away from sleeve H at the middle of their length, by member R, thus giving them a bracing angle. For member R I employ preferably a flat metal ring with slightly upturned or beaded edges mounted concentric with sleeve H, and held thereto by tension-spokes S, similarly to a bicycle wheel, sleeve H being provided with flange F, for anchoring same thereto. Member R may have the rim cut away to lessen weight as desired. Member R may be extended rearwardly beyond arm $a$ a sufficient distance to give the bracing guys from the ends thereof, a rearwardly bracing angle like those of the forward arms. Guys $g$ are of piano wire, or similar material, and extend from the outer ends of arms A over the periphery of R, and to the ends of arms on the opposite side of sleeve H, to which they are suitably fastened. Said guys are also rigidly attached to member R where they embrace the periphery of the same, in any suitable manner; as by clamping or brazing.

I have shown in Fig. 2 one spoke flange with the spokes radiating each side, although two flanges may be mounted on sleeve H, with spokes extending inwardly in the well known manner; as shown in dotted lines in Fig. 2. The member R encircles or embraces arms A, said arms resting in holes or apertures $h$ therein, which serves to partially support arms A at the middle of their length, and to keep same from buckling against strain of guys $g$ and the motive power. By properly shaping the outline of the distance-pieces D, which are mounted perpendicularly to the blade-sides, any desired cross-sectional shape may be given the member B, preferably somewhat similar to the well known aero-curve; the opposite sides of the same being formed to different curvatures see Fig. 4.

By this construction, propellers of any desired diameter, pitch, blade outline and curvature, may be had. It will be readily understood that in propellers of large diameter it may be desirable to use posts or like means, to hold the blade-sides apart; said posts being of different lengths and located so as to produce the desired curvature thereof, and mounted perpendicularly thereto. Also, that in said large propellers it may be necessary, to effect a saving of weight, to use a lighter construction than the metal ring shown in Figs. 1 and 2 for spacing the arm-bracing guys $g$, away from the central member; in which case, a skeleton frame work of steel or wood may be used, having compression members, such as steel tubes or wooden rods, to effect the guy spacing. Said rods may be braced by wire guys to prevent buckling of same. I may also use, in said large propellers, a single arm only for mounting each blade, using the aforesaid formed distance-pieces for separating the blade-sides, and the hereinbefore mentioned means for staying said arm. A single arm may be used comprising several sections, and acting as one, and using the same staying-guys, without departing from the spirit of my invention.

The propellers may also be constructed, by mounting one blade-side only, on the rear of each of said arm-groups, covering the opposite sides of arms A, by strips or shields, extending across and for a short distance on each side of said arms, and secured to members A and B in any suitable manner, as by rivets.

This invention is the same in general principle, as that shown and described in my United States application, Serial Number 516,968, filed September 9th, 1909, and differs only in blade construction and detail.

I do not limit myself to the exact construction shown herein, as various departures in detail may be made herefrom without departing from my invention.

What I claim as new and desire to secure by Letters Patent is:

1. In an aerial propeller, the combination of a hollow central sleeve or body member adapted to be mounted on a power shaft, oppositely disposed groups of radial arms helically disposed thereon, each group comprising a front and rear arm, a universal supporting ring, engaging said arms and held to the sleeve by wire spokes, a curved blade carried on the outer end of each arm group, an arm-bracing guy extending each side from the outer end of the front arm toward the sleeve and rearwardly and spaced laterally away from the sleeve at the center, a guy extending each side from the outer end of each rear arm and toward the sleeve and spaced away therefrom at the center, and means for so spacing the said guys away from the sleeve; said means comprising the aforesaid arm-supporting ring or its equivalent.

2. In an aerial propeller, the combination of a hollow central sleeve adapted to be mounted on a power shaft, front and rear radial arms helically disposed thereon in opposite groups, a double-surfaced curved blade mounted on the outer end of each arm-group, crescent-shaped flat distance pieces mounted between said blade sides and having openings therein for the reception of the arms and disposed transversely thereof, an arm-supporting ring engaging said arms below the blades and held to the sleeve by wire spokes, arm-bracing guys oppositely disposed and extending from the outer end of each arm toward the sleeve, and means for spacing said guys away from the sleeve at center of the propeller; said means comprising the aforesaid arm-supporting ring or its equivalent.

3. In an aerial propeller, the combination of a hollow central sleeve adapted to be mounted on a power shaft, front and rear radial arms mounted thereon in opposite groups, a double-sided curved blade mounted on the outer end of each arm group, crescent-shaped forming or distance pieces mounted between the blade-sides with the greater radius of the curve disposed toward the front of the propeller and transversely of said blade arms, an arm bracing member or ring engaging the arms below the blades and held to the sleeve by wire spokes, arm-bracing guys oppositely disposed and extending from the outer end of each of said arms one on each side thereof and toward the center, and means for spacing said guys laterally away from sleeve at the center; said means comprising the aforesaid arm-supporting ring or its equivalent.

In testimony whereof, I have signed my name to this specification in the presence of two subscribing witnesses, this 9th day of Sept. 1911.

HERBERT E. HAWES.

Witnesses:
C. L. LAZELLE,
HENRY SCHENK.

Copies of this patent may be obtained for five cents each, by addressing the "Commissioner of Patents, Washington, D. C."